(12) United States Patent
Jalobeanu et al.

(10) Patent No.: US 8,244,819 B2
(45) Date of Patent: Aug. 14, 2012

(54) E-MAIL TOOL MANAGEMENT SHELL COMMAND SET

(75) Inventors: Mihai R. Jalobeanu, Sammamish, WA (US); Vivek Sharma, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 64 days.

(21) Appl. No.: 12/897,388

(22) Filed: Oct. 4, 2010

(65) Prior Publication Data

US 2011/0022608 A1 Jan. 27, 2011

Related U.S. Application Data

(62) Division of application No. 11/690,467, filed on Mar. 23, 2007, now Pat. No. 7,836,137.

(51) Int. Cl.
*G06F 15/16* (2006.01)
(52) U.S. Cl. .......................... 709/206; 709/217
(58) Field of Classification Search .......... 709/204–207, 709/217–219; 707/754, 770
See application file for complete search history.

(56) References Cited

U.S. PATENT DOCUMENTS

| | | | |
|---|---|---|---|
| 5,805,298 A * | 9/1998 | Ho et al. ........................ 358/402 |
| 5,826,269 A * | 10/1998 | Hussey ................................ 1/1 |
| 5,875,242 A * | 2/1999 | Glaser et al. ............. 379/201.05 |
| 5,890,163 A * | 3/1999 | Todd .................................... 1/1 |
| 5,987,454 A | 11/1999 | Hobbs |
| 6,366,653 B1 * | 4/2002 | Yeh et al. ................... 379/93.05 |
| 6,429,882 B1 | 8/2002 | Abdelnur et al. |
| 6,721,808 B1 | 4/2004 | Singh |
| 6,850,968 B1 * | 2/2005 | Pfeffer et al. ................. 709/206 |
| 6,987,580 B2 * | 1/2006 | Watanabe et al. ............ 358/1.15 |
| 7,047,495 B1 | 5/2006 | Pang |
| 7,055,014 B1 | 5/2006 | Pawlowski et al. |
| 7,107,544 B1 | 9/2006 | Luke |
| 7,136,461 B1 * | 11/2006 | Swingle et al. ............. 379/88.13 |
| 7,206,816 B2 * | 4/2007 | Gorty et al. .................... 709/206 |
| 7,237,028 B2 * | 6/2007 | Pfeffer et al. ................. 709/226 |
| 7,299,294 B1 | 11/2007 | Bruck et al. |
| 7,609,822 B2 * | 10/2009 | Swingle et al. ............. 379/88.25 |
| 7,716,286 B2 | 5/2010 | Heins et al. |
| 7,836,137 B2 | 11/2010 | Jalobeanu et al. |
| 2002/0013809 A1 | 1/2002 | Hashimoto et al. |
| 2003/0018765 A1 | 1/2003 | Muhlestein et al. |
| 2003/0126195 A1 | 7/2003 | Reynolds et al. |
| 2003/0220978 A1 | 11/2003 | Rhodes |
| 2004/0181418 A1 | 9/2004 | Petersen et al. |
| 2005/0091201 A1 | 4/2005 | Snover et al. |
| 2005/0091586 A1 | 4/2005 | Snover et al. |
| 2005/0177562 A1 | 8/2005 | Raciborski |

(Continued)

OTHER PUBLICATIONS

"Mithi Connect Server Overview", © 2000-2006 Mithi Software Technologies, http://www.mithi.com/products, 6 pages.

(Continued)

*Primary Examiner* — Minh-Chau Nguyen
(74) *Attorney, Agent, or Firm* — Woodcock Washburn LLP

(57) ABSTRACT

A method to execute verb-noun cmdlets to retrieve mailbox information or receive connector information from an e-mail server includes opening an e-mail management tool and receiving and parsing at least one cmdlet having a verb-noun syntax. A get-mailbox cmdlet may retrieve mailbox information from an e-mail server and a get-receiveconnector cmdlet may retrieve receive connector information from the e-mail server. Both cmdlets may have parameters that allow the retrieval of all, one or many mailboxes or receive connectors associated with the e-mail server. One implementation of the e-mail management tool is in a WINDOWS™ computing environment where the management host executes in a POWERSHELL™ scripting environment.

20 Claims, 4 Drawing Sheets

U.S. PATENT DOCUMENTS

2006/0190579 A1 8/2006 Rachniowski et al.
2006/0235930 A1 10/2006 Thurlow

OTHER PUBLICATIONS

AXIGEN Mail Server, HSP Server-Side Scripting Language, Updated Jun. 13, 2006, http://www.axigen.com, 46 pages.

Kim et al., "Design and Implementation of a Web-based Internet/Intranet Mail Server Management System", Department of Computer Science and Engineering, IEEE International Conference on Communications, Jun. 6-10, 1999, 1(641-645), 1-5.

* cited by examiner

E-MAIL TOOL MANAGEMENT SHELL COMMAND SET

CROSS-REFERENCE TO RELATED APPLICATION

This application is a divisional of U.S. patent application Ser. No. 11/690,467, filed Mar. 23, 2007, entitled "E-MAIL TOOL MANAGEMENT SHELL COMMAND SET," now U.S. Pat. No. 7,836,137, issued Nov. 16, 2010, the contents of which is incorporated by reference herein in its entirety.

BACKGROUND

E-mail servers continue to evolve to better serve the needs of e-mail service subscribers. The overhead in terms of management time and effort time and effort of such servers increases as subscription rates rise. This places a ever-growing burden on system administrators to maintain e-mail servers in an operational state. Scripting standard maintenance operations is a method whereby some administrators control the time investment for maintenance. Well-written scripts are advantageously re-used to perform maintenance tasks which are unique to the administration of any given e-mail server system.

A need arises to develop an intuitive scripting language specifically designed for IT administration use that targets e-mail servers. The present invention addresses this and other aspects of the administration of e-mail servers with an e-mail specific scripting language.

SUMMARY

In one aspect of the invention, administrators can operate an e-mail management tool, such as MICROSOFT® EXCHANGE™ using a management shell that supports an intuitive verb-noun scripting language. One such management shell is the EXCHANGE MANAGEMENT SHELL™ which uses WINDOWS® POWERSHELL™. In such a system, the e-mail server may be maintained by executing objects called cmdlets. E-mail server specific cmdlets include the get-mailbox and get-receiveconnector functions. The get-mailbox cmdlet retrieves mailbox information from the e-mail server and the get-receiveconnector cmdlet retrieves receive connector information from the e-mail server. Both cmdlets may operate with arguments or specified parameters to assist in the identification of mailboxes and connectors. Both cmdlets may operate with pipeline extensions allowing retrieved results to be used by subsequent cmdlets.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The following description is better understood when read in conjunction with the appended drawings. For purposes of illustrating the management shell, there is shown in the drawings exemplary constructions of the management shell; however, the management shell is not limited to the specific methods and instrumentalities disclosed. In the drawings.

DETAILED DESCRIPTION

Exemplary Embodiments

Figure 1:
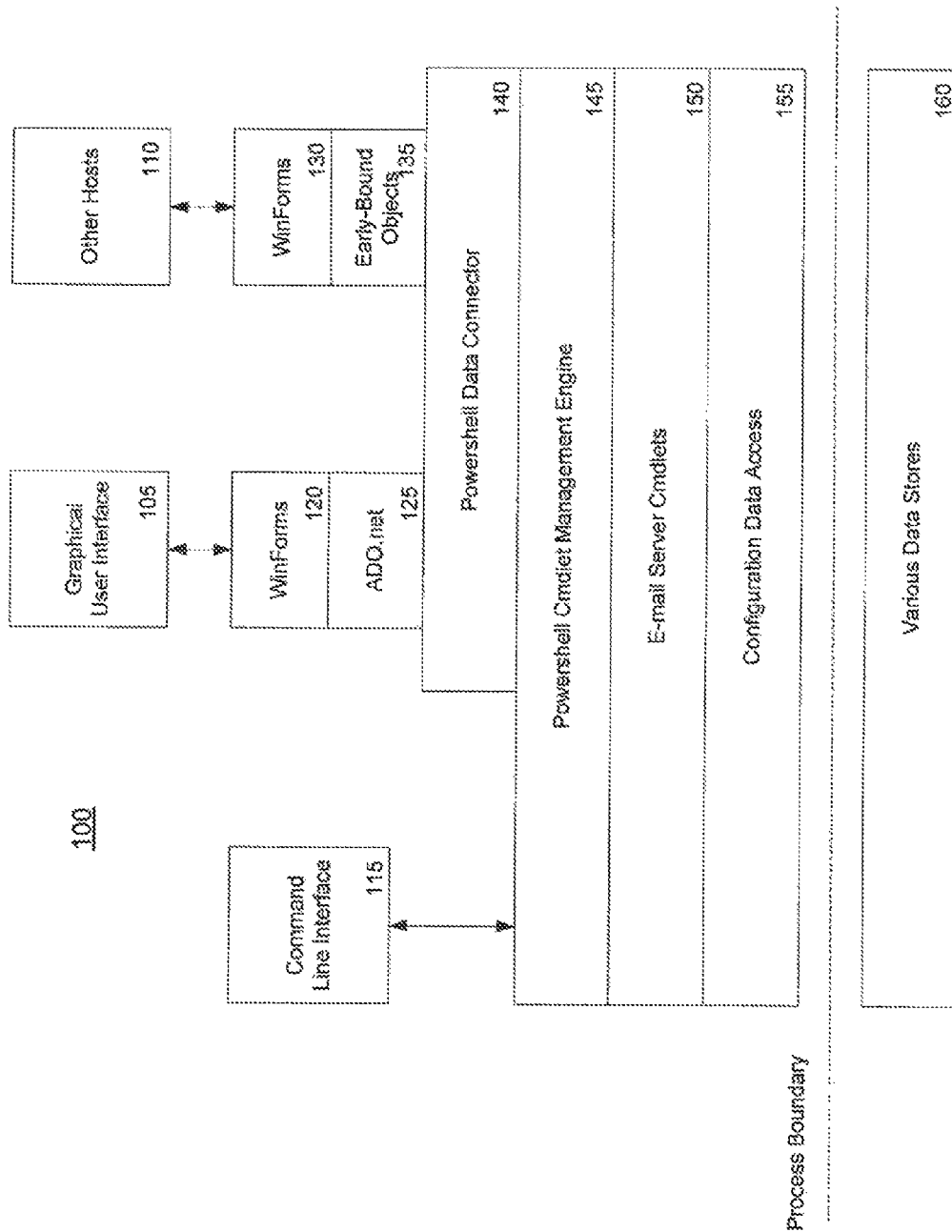
FIG. 1 is a block diagram showing an example software architecture for a system supporting the execution of cmdlets for e-mail server management.

One method to address the need for a scripting language for e-mail servers is to start from existing developments and generate an improvement targeted to the e-mail server application. WINDOWS™ POWERSHELL,™ available from MICROSOFT® of Redmond, Wash., is a command line shell and task-based scripting technology that provides information technology (IT) administrators comprehensive control and automation of system administration tasks, which can increase administrator productivity. WINDOWS™ POWERSHELL™ includes numerous system administration utilities, consistent syntax and naming conventions, and improved navigation of common management data. POWERSHELL™ also includes an intuitive scripting language specifically designed for IT administration and thus can be used as a basis for the administration of an e-mail server. One version of e-mail server is the EXCHANGE™ e-mail server, also available from MICROSOFT®. The administration of the EXCHANGE™ e-mail server can be performed using an extension of POWERSHELL™ scripting environment.

The EXCHANGE MANAGEMENT SHELL™ is an extension of WINDOWS™ POWERSHELL™ that gives EXCHANGE™ administrators the ability to manage various features of the email server interactively from the command line or by editing and running scripts. This is achieved by providing an EXCHANGE™-specific command set that integrates with WINDOWS™ POWERSHELL™

The EXCHANGE MANAGEMENT SHELL™ is a collection of about 350 commands that constitute the public application programming interface (API) for managing MICROSOFT® EXCHANGE™ and its future versions. This public API can be interactively used from the WINDOWS™ POWERSHELL™ command line shell, from WINDOWS™ POWERSHELL™ scripts or can be invoked from managed code (e.g. C# programs).

EXCHANGE MANAGEMENT SHELL™ represents an improvement in the administration of e-mail servers via a scripting language because the POWERSHELL™ building block-like cmdlets (verb-noun commands) contain logic to validate user inputs, deal with system errors, can provide progress reporting where appropriate, and can output verbose information on demand. Cmdlets are designed to interoperate seamlessly and intuitively with other cmdlets of the same family, removing the need for explicit interface programming. The cmdlets can be interactively invoked from the command line or can be called from scripts and as stated above, the cmdlets are compatible with WINDOWS POWERSHELL™

The EXCHANGE MANAGEMENT SHELL™ provides a consistent and intuitive way for executing EXCHANGE™ management operations from the command line. It consists of a set of commands implemented according to the WINDOWS® POWERSHELL™ rules. Thus, one can use WINDOWS® POWERSHELL™ and the EXCHANGE MANAGEMENT SHELL™ extension to create EXCHANGE™ mailboxes, enumerate EXCHANGE™ servers, delete databases and other maintenance and administrative tasks. By abiding by the WINDOWS® POWERSHELL™ rules, the EXCHANGE MANAGEMENT SHELL™ automatically inherits the command line and scripting support provided by POWERSHELL™, as well as interoperability with the WINDOWS® POWERSHELL™ built-in commands and the .NET™ Framework.

Of the 350 or so cmdlets developed for EXCHANGE MANAGEMENT SHELL,™ two cmdlets stand out as often-used and noteworthy in their utility. The two cmdlets are get-mailbox and get-receive connector. These two e-mail specific cmdlets can be executed in the WINDOWS™ POWERSHELL™ engine which is described briefly below.

FIG. 1 depicts an architecture 100 which allows execution of cmdlets for e-mail server applications. The architecture allows the use of cmdlets via a command line interface 115, a graphical user interface (GUI) 105 and or other hosts 110, such as an interactive web service. The same cmdlets may be used as a result of any interaction by the user via the command line 115, GUI 105 or another host. As a result, the user experience and performance using any of the interfaces is essentially the same because the same cmdlets are invoked for a given task requested from any of the user interfaces 115, 105, and 110.

Cmdlets are the basic units of execution of a management engine 145 such as the MICROSOFT® POWERSHELL™. A cmdlet is named by two parts: a verb and a noun. The standard format for a cmdlet is with the noun following the verb, with a dash in between. An example is "get-mailbox", which is a cmdlet that acquires information concerning mailboxes. Verb-noun is the naming convention used that specifies with clarity what cmdlets do. This naming convention is enforced programmatically in the construction of cmdlets. Cmdlets are .NET™ classes designed to use the features of the cmdlet management engine environment.

Cmdlets contain the business logic and are separate and independent from the GUI, command interface, or any other user interface. These user interfaces are absent business logic programming because such programming is located solely in the cmdlets. Cmdlets may be treated like objects in terms of maintaining them, but they exhibit special behavior and thus are quite different from standard objects such as application files, pictures, and the like. Unlike most objects, cmdlets can be executed to perform a task. Cmdlets are created using a specific set of rules. Those rules include, but are not limited to, how cmdlets receive input from the user, how parameters are declared as mandatory or optional and how progress, warnings, and errors are reported back to the user. Cmdlets are not equivalent to objects because cmdlets must follow strict rules and APIs that are defined by the management shell and the data provider. Objects have no requirements to be executable and to follow APIs defined by the management shell.

Cmdlets 150 for an e-mail server, such as EXCHANGE™ are made available to a management engine 145 which performs tasks based on the execution of cmdlets. An example of the management engine is the MICROSOFT® WINDOWS™ POWERSHELL™ engine. The POWERSHELL™ engine can pass data between various mail tool cmdlets as objects which are structured data. POWERSHELL™ can be used by many different host e-mail applications, each host providing input and consuming output of cmdlets in whatever way necessary. In particular, a command line host can let the user type text and use that as input, then convert objects to their string representation and provide that as the output. GUI applications can use complex user interfaces to obtain input from the end user and can draw complex lists, property pages and other graphic elements with the results of cmdlets. Cmdlets are specially constructed .NET classes that encompass all the business logic for a particular operation. For example, moving a mailbox is represented by the cmdlet "move-mailbox". This code can be called directly from the command line interface 105 or a script using the command line. The cmdlets may call into internal libraries that help them do some work, such as connecting to a data source 160, such as the WINDOWS™ ACTIVE DIRECTORY™ also available through MICROSOFT®.

When using e-mail server cmdlets, the management engine 145 may have access to configuration data access 155 so that the actions of executed cmdlets can access data from various data stores 160. This basic capability to use cmdlets 150 via the management engine 145 permits the construction of user interfaces which can operate in such a way as to render the same user experience while the user is using a command line interface 115, a graphical user interface, 105 or some other host 110, such as a web service interface.

When using a command line interface 115, the user would invoke a cmdlet via the management engine 145. A specific cmdlet may execute which has configuration data access 155 to various data stores 160 to assist in the execution of a user command from the command line interface 115. Similarly, the user at a graphical user interface 105 may request a function that essentially performs the same task using the same cmdlets as the command line interface 115.

The graphical user interface 105 communicates with a WinForms function 120 that provides the graphical user interface application programming interface (API) included as a part of MICROSOFT's .NET™ Framework, providing access to the native MICROSOFT® WINDOWS™ interface elements by wrapping the existing Win32 API in managed code. GUI framework 105 is designed to execute cmdlets rather than call business logic directly. This separates this GUI from others previously conceived because the business logic is removed from the GUI programming. As mentioned above, the business logic is contained in the cmdlets for uniformity of user experience and machine performance. The GUI works through the WinForms 120 functional block which communicates with the .NET™ version of Active Data Objects (ADO) 125. The POWERSHELL™ data connector 140 supports collecting and formatting data that can be returned by using cmdlets.

One e-mail server scripting element is the get-mailbox cmdlet which can execute in the environment of FIG. 1. The get-mailbox cmdlet enumerates some or all existing email mailboxes in an EXCHANGE™ deployment. In doing so it outputs structured data (i.e. objects) for each mailbox requested. The output objects have properties representing the various configuration aspects of a mailbox, such as, a name, address, quota limits, and other aspects. Some properties and configuration aspects can include information concerning an alias, the name of a mailbox store, e-mail delivery restrictions such as sending message size, receiving message size, message restrictions, delivery options such as send on behalf of, forwarding address, recipient limits, storage limits such as mailbox storage limits, and deleted item retention, protocol settings such as enable, disable, OWA, POP3, IMAP4, OMA, Sync, Up-to-date & modify settings of POP3 and IMAP, message encoding, and character set. Other configuration aspects include options to hide from EXCHANGE™ address lists, custom attributes, Internet locator service settings, mailbox rights such as permissions for mailbox access, and EXCHANGE™ e-mail addresses manipulations such as new, edit, remove, set as primary, and use recipient policies. Additional information can include mailbox user first name, last name, display name, office address, home address, telephone numbers and organization information such as title, department, company, manager, and direct reports.

The mailbox-related output objects and the values of their properties can be displayed to the user or can be used in further processing. Further processing can include the addition of a pipeline-type command. Pipelining in the EXCHANGE MANAGEMENT SHELL™ is the act of down-level cmdlet using the output of another previous cmdlet when it performs an operation. Pipelining is accomplished by using the pipe "|" symbol. All verbs in the same cmdlet set can use piped information from another cmdlet. Some verb-noun cmdlet sets also let you pass data through the pipeline to another verb-noun cmdlet set. As an example, pipelining can be used with the get-mailbox cmdlet to perform an action using the get-mailbox returned objects to another cmdlet such as set-mailbox. Thus the get-mailbox command can be used to inspect the configuration of one or more mailboxes or can be aggregated in larger pipelines or scripts. For example, one can change the quota of all users to 1 GB with names starting with "a" by running the following pipeline:

get-mailbox a*|set-mailbox–prohibitsendquota 1 GB

The get-mailbox cmdlet has three modes of operation; to retrieve all existing mailboxes, to retrieve just one mailbox, or to retrieve multiple mailboxes. In retrieving all mailboxes, the get-mailbox cmdlet is executed with no filtering parameters (i.e. "get-mailbox"). To retrieve one mailbox, the get-mailbox cmdlet is constructed and executed while specifying the identity of the mailbox as an argument or parameter to the get-mailbox cmdlet, such as in: "get-mailbox name@MICROSOFT.com". The parameter or argument that specifies identity can take multiple forms. For example, the identity parameter can be expressed as a globally unique identifier (GUID), a distinguished name (DN), a Domain\Account name, a user principal name (UPN), LegacyEXCHANGEDN, a simple mail tool protocol (SMTP) address, and an alias. To retrieve multiple mailboxes, an argument or parameter is appended to the get-mailbox cmdlet that is based on some common criteria. For example, in the example "get-mailbox-organizational unit Users", the cmdlet would act to return all mailboxes in the organizational unit container called Users. In another example, the cmdlet expression "get-mailbox abc*", would act return all mailboxes with names starting with "abc".

Figure 2:
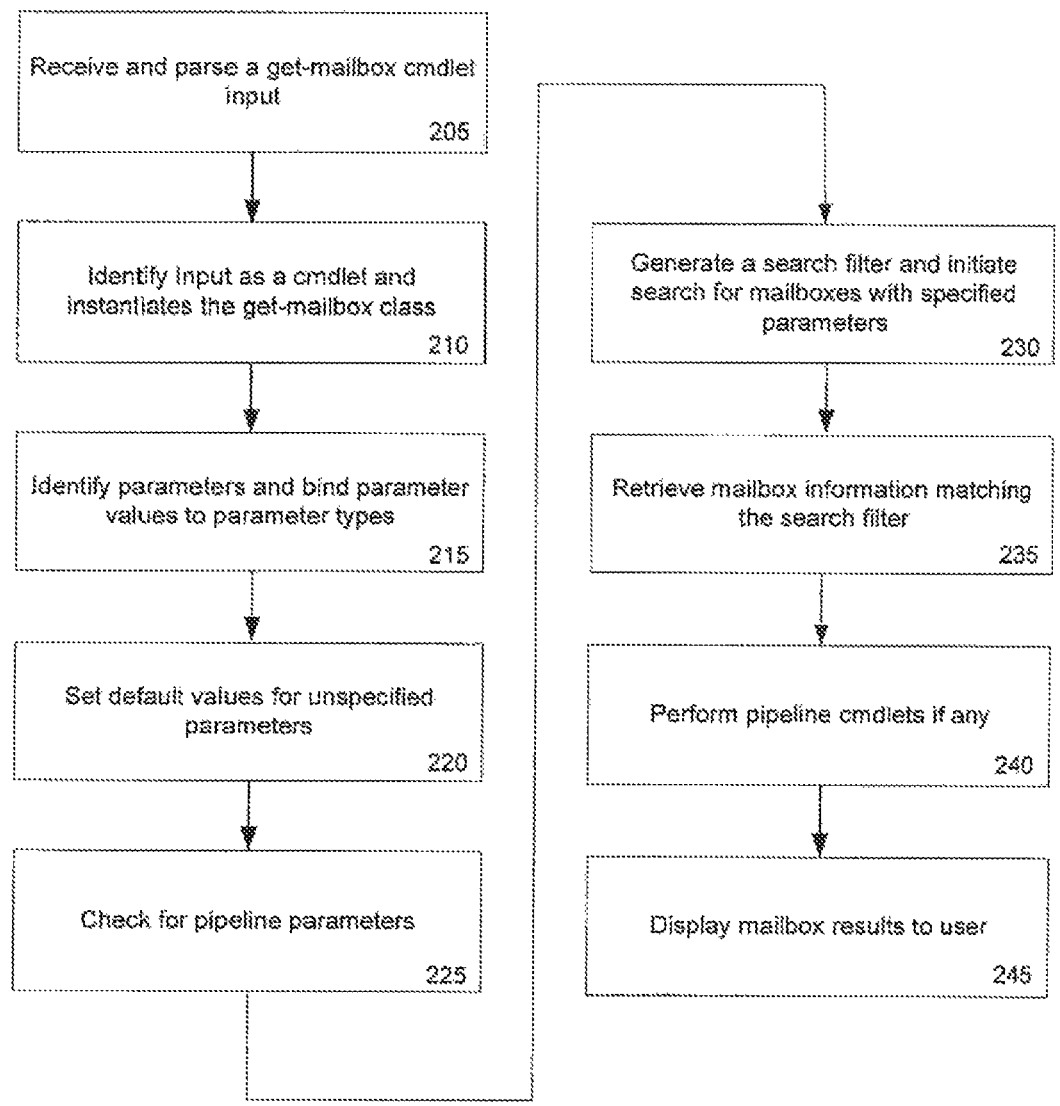
FIG. 2 is an example flow diagram depicting a method of executing a get-mailbox cmdlet.

FIG. 2 depicts an example flow diagram 200 of the execution of the get-mailbox cmdlet. At step 205, the process receives and parses a cmdlet command line input. In one embodiment, this step involves the startup of POWERSHELL™ and a user or program enters the get-mailbox cmdlet and argument such as "get-mailbox-Identity user@domain name.com". At step 210, the execution engine, such as POWERSHELL™, identifies that the first command name is "get-mailbox" cmdlet. A cmdlet registration database is searched and the execution engine determines that the class registered under the name "get-mailbox" is the GetMailbox class. In one embodiment, the GetMailbox class is provided by the EXCHANGE™ cmdlet functions and POWERSHELL™ instantiates the GetMailbox class by calling its default constructor. In step 215, the rest of the command line input is further parsed to identify the parameter names that are being referenced. For each parameter in the command line, the execution engine performs parameter binding, which includes inspecting the definition of the parameter by reflecting on the class GetMailbox to determine the parameter type. In this example provided above, the parameter is Identity of type MailboxIdParameter. The execution engine then invokes a method of the type MailboxIdParameter to create an instance of this type from a string. The execution engine then sets the property Identity of the instance of GetMailbox created earlier to the value previously obtained and invokes the BeginProcessing method of GetMailbox to begin full processing of the get-mailbox cmdlet.

At step 220, the GetMailbox method then defaults the other search options which can be specified in the command line, such as DomainController, search scope, number of results, and others to their default values. The method then opens an ACTIVE DIRECTORY™ session and returns. At step 225, the process 200 checks for the existence of pipeline arguments to the get-mailbox cmdlet and collects the appropriate parameters. The execution engine binds the parameters that match the pipeline input, if any. The execution engine then invokes the ProcessRecord method of GetMailbox to collect records pertaining to the cmdlet request. At step 230, the process GetMailbox uses the specified parameters to create a search filter. In the example case, the search filter is based on the value of Identity.

At step 235, an API is initiated to write any retrieved information to a display device for user observance. In the implementation involving POWERSHELL™, the GetMailbox method calls the WriteVerbose API to output localized logging information back to the user. This call can occur multiple times throughout the execution. Step 235 also issues a search to retrieve the information matching mailboxes which meet the search filter parameters. In the implementation of a WINDOWS™ operating system, ACTIVE DIRECTORY™ may be used as the searching engine. For each search result, the GetMailbox method creates an instance of the Mailbox type and sets it up based on the properties retrieved from ACTIVE DIRECTORY™.

At step 240, the search results are further processed by any additional pipeline instruction associated with the get-mailbox cmdlet input. In the POWERSHELL™ implementation, the method GetMailbox calls the WriteObject POWERSHELL™ API to send the Mailbox instance back to the POWERSHELL™ pipeline. If there is a pipeline command associated with the get-mailbox cmdlet, POWERSHELL™ would run the down-level cmdlet. If the get-mailbox cmdlet on the command line input is not a pipeline, POWERSHELL™ outputs the property names and values of the Mailbox object to the console at step 240. Thus, cmdlets need not have a pipeline parameter.

In one implementation, the GetMailbox method loops until all the search results have been processed. In case of an error, the GetMailbox method calls the WriteError POWERSHELL™ API passing a localized string describing the error condition. Eventually, the call to ProcessRecord returns and the process repeats from step 225 as long as there are any more objects in the pipeline for get-mailbox to process. If there are no additional objects in the pipeline, then POWERSHELL™ calls the EndProcessing method of GetMailbox to end processing.

Another significant e-mail server scripting element is the get-receiveconnector cmdlet which can execute in the environment of FIG. 1. In general, this cmdlet executes similarly to the get-mailbox cmdlet but performs a different function. The get-receiveconnector cmdlet enumerates one or more of the receive connectors for a particular e-mail server, such as the EXCHANGE™ server, that has the Hub Transport or the Edge Transport role installed. The Hub Transport role (also known as a "bridgehead") handles internal transport and routing and may be tightly integrated with some directory services, such as ACTIVE DIRECTORY™ in a WINDOWS™ operating system. The Hub Transport role can also apply policies to messages to enforce compliance requirements. The Edge Transport role provides antivirus and anti-spam protection for e-mails servers, such as the EXCHANGE™ e-mail server, and protection for organizations at the perimeter of a network. Receive connectors represent a logical gateway through which all inbound messages are received by an e-mail server. Thus, receive connectors are basic configuration elements for e-mail flow.

The get-receiveconnector cmdlet outputs objects; one per receive connector. These objects have associated properties representing various configuration aspects, such as name, IP address, port number, authentication mechanism, and the like. The output objects and the values of their properties can be displayed to the user or can be used in further processing. As above, the pipeline method of parameter expression can be used to transfer retrieved objects to another cmdlet like remove-receiveconnector cmdlet. Thus the get-receiveconnector cmdlet can be used to inspect the configuration of one or more connectors or can be aggregated in larger pipelines or scripts. For example, one can change the connection timeout of all receive connectors for the server Foo to 150000 time units by running the following pipeline:

get-receiveconnector–server Foo|set-receiveconnector–ConnectionTimeOut 15000

The get-receiveconnector cmdlet has three modes of operation; to retrieve all receive connectors on the local e-mail server, retrieve just one receive connector, or to retrieve multiple receive connectors. In retrieving all receive connectors, the get-receiveconnector cmdlet is executed with no filtering parameters (i.e. "get-receiveconnector"). To retrieve one receive connector, the get-receiveconnector cmdlet is constructed and executed while specifying the identity of the connector as an argument or parameter to the get-receiveconnector cmdlet, such as in: "get-receiveconnector MyConnector". The parameter or argument that specifies the identity of the receive connector can take multiple forms. For example, the receive connector identity parameter can be expressed as a globally unique identifier (GUID), a connector name that represents a specific receive connector, and a server name using the format ServerName\ConnectorName. To retrieve multiple receive connectors, an argument or parameter is appended to the get-receive connector cmdlet that is based on some common criteria. For example, in the example "get-receiveconnector abc*", the cmdlet would act to return all receive connectors on the local e-mail server with names starting with "abc".

Figure 3:
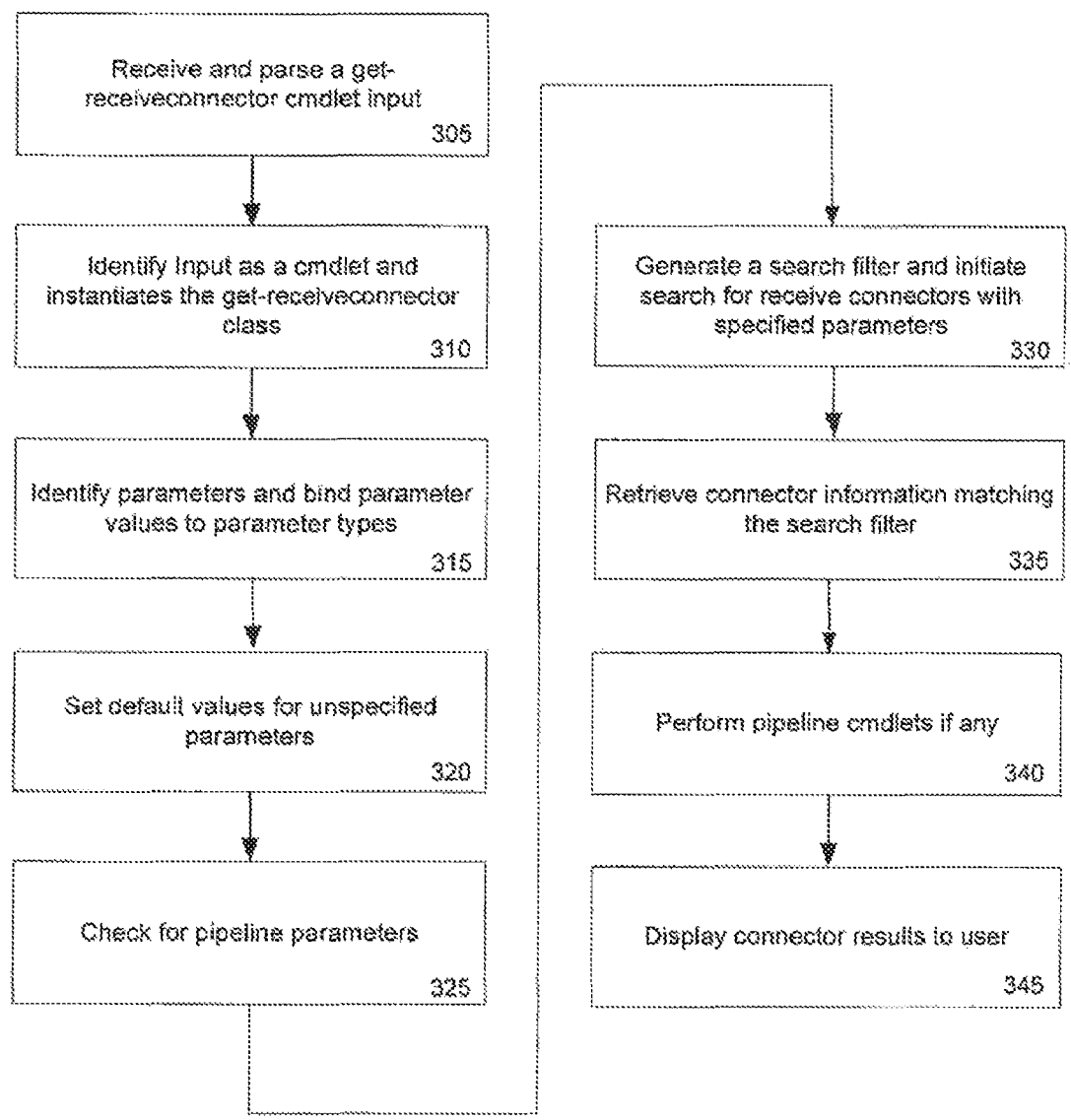
FIG. 3 is an example flow diagram depicting a method of executing a get-receiveconnector cmdlet.

FIG. 3 depicts an example flow diagram 300 of a the execution of the get-receiveconnector cmdlet. At step 305, the process receives and parses a cmdlet command line input. In one embodiment, this step involves the startup of POWERSHELL™ and a user or program enters the get-receiveconnector cmdlet and argument such as "get-receiveconnector-server ABC". At step 310, the execution engine, such as POWERSHELL™, identifies that the first command name is "get-receiveconnector" cmdlet. A cmdlet registration database is searched and the execution engine determines that the class registered under the name "get-receiveconnector" is the GetReceiveConnector class. In one embodiment, the GetReceiveConnector class is provided by the EXCHANGE™ cmdlet functions and POWERSHELL™ instantiates the GetReceiveConnector class by calling its default constructor. In step 315, the rest of the command line input is further parsed to identify the parameter names that are being referenced. For each parameter in the command line, the execution engine performs parameter binding, which includes inspecting the definition of the parameter by reflecting on the class GetReceiveConnector to determine the parameter type. In this example provided above, the parameter is Server of type ServerIdentity. The execution engine then invokes a method of the type ServerIdentity to create an instance of this type from a string. The execution engine then sets the property Server of the instance of GetReceiveConnector created earlier to the value previously obtained invokes the BeginProcessing method of GetReceiveConnector to begin full processing of the get-receiveconnector cmdlet.

At step 320, the GetReceiveConnector method then defaults to the other search options which can be specified in the command line, such as DomainController, search scope, number of results, and others to their default values. The method then opens an ACTIVE DIRECTORY™ session and returns. At step 325, the process 300 checks for the existence of pipeline arguments to the get-receiveconnector cmdlet and collects the appropriate parameters. The execution engine binds the parameters that match the pipeline input, if any. The execution engine then invokes the ProcessRecord method of GetReceiveConnector to collect records pertaining to the cmdlet request. At step 330, the process GetReceiveConnector uses the specified parameters to create a search filter. In the example case, the search filter is based on the value of Server.

At step 335, an API is initiated to write any retrieved information to a display device for user observance. In the implementation involving POWERSHELL™, the GetReceiveConnector method calls the WriteVerbose API to output localized logging information back to the user. This call can occur multiple times throughout the execution. Step 335 also issues a search to retrieve the information matching connectors corresponding to the search filter parameters. In the implementation of a WINDOWS™ operating system, ACTIVE DIRECTORY™ may be used as the searching engine. For each search result, the GetReceiveConnector method creates an instance of the ReceiveConnector type and sets it up based on the properties retrieved from ACTIVE DIRECTORY™.

At step 340, the search results are further processed by any additional pipeline instruction associated with the get-receiveconnector cmdlet input. In the POWERSHELL™ implementation, the method GetReceiveConnector calls the WriteObject POWERSHELL™ API to send the ReceiveConnector instance back to the POWERSHELL™ pipeline. If there is a pipeline command associated with the get-receiveconnector cmdlet, POWERSHELL™ would run the down-level cmdlet. If the get-receiveconnector cmdlet on the command line input is not a pipeline, POWERSHELL™ outputs the property names and values of the Server object to the console at step 340. Thus, a pipeline is not strictly necessary in the flow 300 of FIG. 3 and may be considered optional.

In one implementation, the GetReceiveConnector method loops until all the search results have been processed. In case of an error, the GetReceiveConnector method calls the WriteError POWERSHELL™ API passing a localized string describing the error condition. Eventually, the call to ProcessRecord returns and the process repeats from step 325 as long as there are any more objects in the pipeline for get-receiveconnector to process. If there are no additional objects in the pipeline, then POWERSHELL™ calls the EndProcessing method of GetReceiveConnector to end processing.

As an aspect of the invention, a computer-readable medium, such as, but not limited to, magnetic storage devices, optical devices, such as CD and DVD media may be used to store computer program instructions which can implement methods discussed or suggested herein. Such computer media are envisioned to retain executable instructions for use on a general purpose computer to enable it to practice aspects of the invention.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Exemplary Computing Device

Figure 4:
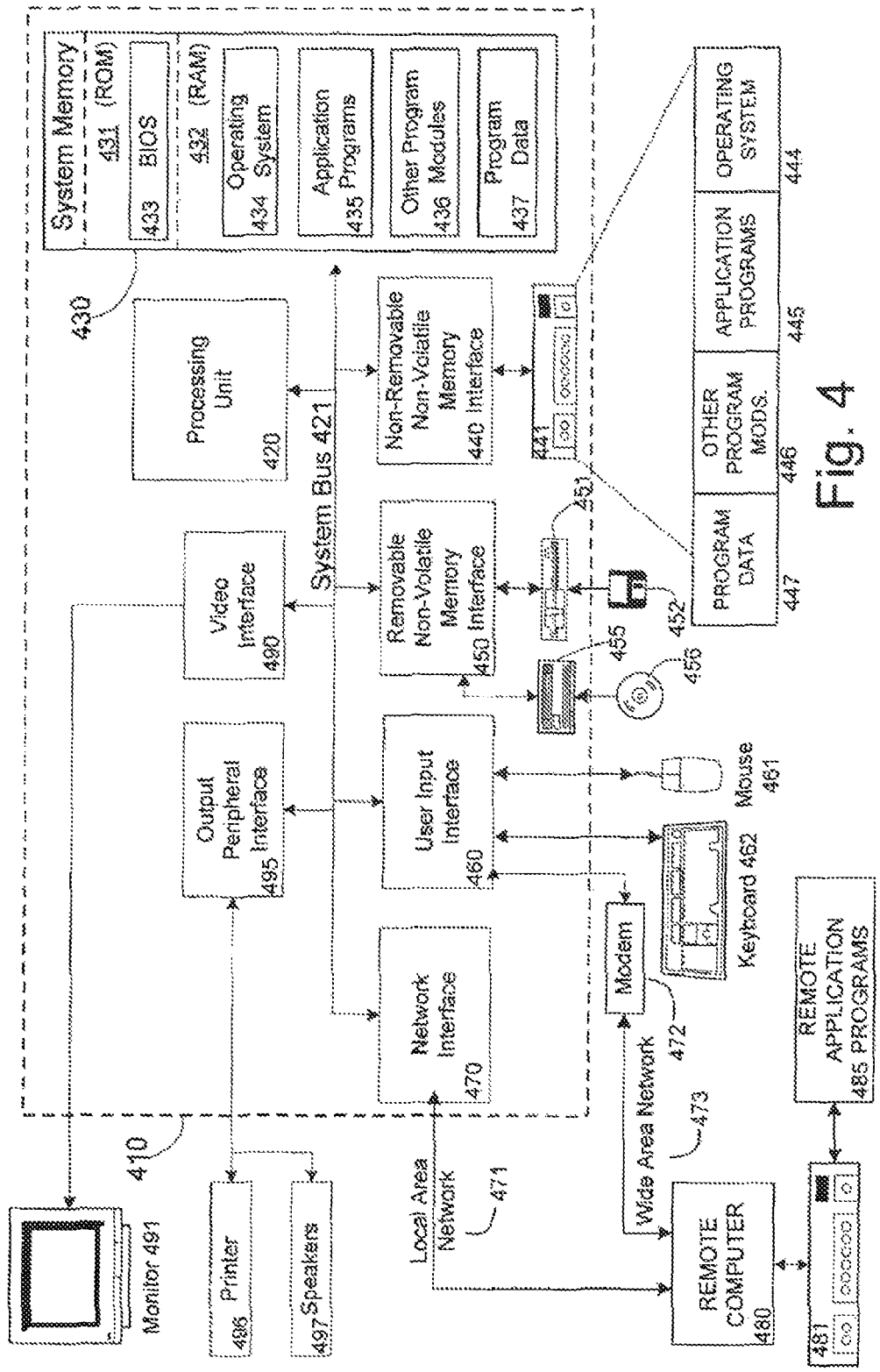
FIG. 4 is a block diagram showing an example host computing environment in which aspects of the invention may be implemented.

FIG. 4 and the following discussion are intended to provide a brief general description of host computer suitable for interfacing with the media storage device. While a general purpose computer is described below, this is but one single processor example, and embodiments of the host computer with multiple processors may be implemented with other computing devices, such as a client having network/bus interoperability and interaction.

Although not required, embodiments of the invention can also be implemented via an operating system, for use by a developer of services for a device or object, and/or included within application software. Software may be described in the general context of computer-executable instructions, such as program modules, being executed by one or more computers, such as client workstations, servers or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that various embodiments of the invention may be practiced with other computer configurations. Other well known computing systems, environments, and/or configurations that may be suitable for use include, but are not limited to, personal computers (PCs), automated teller machines, server computers, hand-held or laptop devices, multi-processor systems, microprocessor-based systems, programmable consumer electronics, network PCs, appliances, lights, environmental control elements, minicomputers, mainframe computers and the like. Embodiments of the invention may also be practiced in distributed computing environments where tasks are performed by remote processing devices that are linked through a communications network/bus or other data transmission medium. In a distributed computing environment, program modules may be located in both local and remote computer storage media including memory storage devices and client nodes may in turn behave as server nodes.

With reference to FIG. 4, an exemplary system for implementing an example host computer includes a general purpose computing device in the form of a computer system 410. Components of computer system 410 may include, but are not limited to, a processing unit 420, a system memory 430, and a system bus 421 that couples various system components including the system memory to the processing unit 420. The system bus 421 may be any of several types of bus structures including a memory bus or memory controller, a peripheral bus, and a local bus using any of a variety of bus architectures.

Computer system 410 typically includes a variety of computer readable media. Computer readable media can be any available media that can be accessed by computer system 410 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, Random Access Memory (RAM), Read Only Memory (ROM), Electrically Erasable Programmable Read Only Memory (EEPROM), flash memory or other memory technology, Compact Disk Read Only Memory (CDROM), compact disc-rewritable (CDRW), digital versatile disks (DVD) or other optical disk storage, magnetic cassettes, magnetic tape, magnetic disk storage or other magnetic storage devices, or any other medium which can be used to store the desired information and which can accessed by computer system 410.

The system memory 430 includes computer storage media in the form of volatile and/or nonvolatile memory such as read only memory (ROM) 431 and random access memory (RAM) 432. A basic input/output system 433 (BIOS), containing the basic routines that help to transfer information between elements within computer system 410, such as during start-up, is typically stored in ROM 431. RAM 432 typically contains data and/or program modules that are immediately accessible to and/or presently being operated on by processing unit 420. By way of example, and not limitation, FIG. 4 illustrates operating system 433, application programs 435, other program modules 436, and program data 437.

The computer system 410 may also include other removable/non-removable, volatile/nonvolatile computer storage media. By way of example only, FIG. 4 illustrates a hard disk drive 431 that reads from or writes to non-removable, nonvolatile magnetic media, a magnetic disk drive 451 that reads from or writes to a removable, nonvolatile magnetic disk 452, and an optical disk drive 455 that reads from or writes to a removable, nonvolatile optical disk 456, such as a CD ROM, CDRW, DVD, or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 441 is typically connected to the system bus 421 through a non-removable memory interface such as interface 440, and magnetic disk drive 451 and optical disk drive 455 are typically connected to the system bus 421 by a removable memory interface, such as interface 450.

The drives and their associated computer storage media discussed above and illustrated in FIG. 4 provide storage of computer readable instructions, data structures, program modules and other data for the computer system 410. In FIG. 4, for example, hard disk drive 441 is illustrated as storing operating system 444, application programs 445, other program modules 446, and program data 447. Note that these components can either be the same as or different from operating system 444, application programs 445, other program modules 446, and program data 447. Operating system 444, application programs 445, other program modules 446, and program data 447 are given different numbers here to illustrate that, at a minimum, they are different copies.

A user may enter commands and information into the computer system 410 through input devices such as a keyboard 462 and pointing device 461, commonly referred to as a mouse, trackball or touch pad. Other input devices (not shown) may include a microphone, joystick, game pad, satellite dish, scanner, or the like. These and other input devices are often connected to the processing unit 420 through a user input interface 460 that is coupled to the system bus 421, but may be connected by other interface and bus structures, such as a parallel port, game port or a universal serial bus (USB). A monitor 491 or other type of display device is also connected to the system bus 421 via an interface, such as a video interface 490, which may in turn communicate with video memory (not shown). In addition to monitor 491, computer systems may also include other peripheral output devices such as speakers 497 and printer 496, which may be connected through an output peripheral interface 495.

The computer system 410 may operate in a networked or distributed environment using logical connections to one or more remote computers, such as a remote computer 480. The remote computer 480 may be a personal computer, a server, a router, a network PC, a peer device or other common network node, and typically includes many or all of the elements described above relative to the computer system 410, although only a memory storage device 481 has been illustrated in FIG. 4. The logical connections depicted in FIG. 4 include a local area network (LAN) 471 and a wide area network (WAN) 473, but may also include other networks/buses. Such networking environments are commonplace in homes, offices, enterprise-wide computer networks, intranets and the Internet.

When used in a LAN networking environment, the computer system 410 is connected to the LAN 471 through a network interface or adapter 470. When used in a WAN networking environment, the computer system 410 typically includes a modem 472 or other means for establishing communications over the WAN 473, such as the Internet. The modem 472, which may be internal or external, may be connected to the system bus 421 via the user input interface 460, or other appropriate mechanism. In a networked environment, program modules depicted relative to the computer system 410, or portions thereof, may be stored in the remote memory storage device. By way of example, and not limitation, FIG. 4 illustrates remote application programs 485 as residing on memory device 481. It will be appreciated that the network connections shown are exemplary and other means of establishing a communications link between the computers may be used.

Various distributed computing frameworks have been and are being developed in light of the convergence of personal computing and the Internet. Individuals and business users alike are provided with a seamlessly interoperable and Web-enabled interface for applications and computing devices, making computing activities increasingly Web browser or network-oriented.

For example, MICROSOFT®'s .NET™ platform, available from MICROSOFT Corporation, includes servers, building-block services, such as Web-based data storage, and downloadable device software. While exemplary embodiments herein are described in connection with software residing on a computing device, one or more portions of an embodiment of the invention may also be implemented via an operating system, application programming interface (API) or a "middle man" object between any of a coprocessor, a display device and a requesting object, such that operation may be performed by, supported in or accessed via all of .NET™'s languages and services, and in other distributed computing frameworks as well.

As mentioned above, while exemplary embodiments of the invention have been described in connection with various computing devices and network architectures, the underlying concepts may be applied to any computing device or system in which it is desirable to implement a method for performing tasks on an e-mail server. Thus, the methods and systems described in connection with embodiments of the present invention may be applied to a variety of applications and devices. While exemplary programming languages, names and examples are chosen herein as representative of various choices, these languages, names and examples are not intended to be limiting. One of ordinary skill in the art will appreciate that there are numerous ways of providing object code that achieves the same, similar or equivalent systems and methods achieved by embodiments of the invention.

The various techniques described herein may be implemented in connection with hardware or software or, where appropriate, with a combination of both. Thus, the methods and apparatus of the invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention.

While aspects of the present invention has been described in connection with the preferred embodiments of the various figures, it is to be understood that other similar embodiments may be used or modifications and additions may be made to the described embodiment for performing the same function of the present invention without deviating therefrom. Furthermore, it should be emphasized that a variety of computer platforms, including handheld device operating systems and other application specific operating systems are contemplated, especially as the number of wireless networked devices continues to proliferate. Therefore, the claimed invention should not be limited to any single embodiment, but rather should be construed in breadth and scope in accordance with the appended claims.

What is claimed:

1. A method to retrieve mailbox configuration information from an e-mail server, the method comprising:
   entering an interactive command line and scripting software environment, the environment providing access to execute verb-noun commands in conjunction with the e-mail server;
   receiving and parsing an input requesting mailbox configuration information from the e-mail server, the input requesting mailbox configuration information from the e-mail server comprising a verb-noun command and having at least one identity parameter identifying at least one mailbox;
   identifying the verb-noun command as a get-mailbox cmdlet and initiating a corresponding cmdlet class;
   examining the at least one identity parameter for parameter type and binding a property value to the parameter type;
   examining the input requesting mailbox configuration information from the e-mail server for a presence of a pipeline verb-noun command,
   generating a search filter for the mailbox configuration information based on the parameter type and the property value;
   searching the e-mail server and returning retrieved mailbox information matching the search filter;
   executing the pipeline verb-noun command, if present, the pipeline verb-noun command specifying an action to be taken with the retrieved mailbox information; and
   displaying the retrieved mailbox information.

2. The method of claim 1, wherein the interactive command line and scripting software environment is an instance of a WINDOWS™ POWERSHELL™ environment.

3. The method of claim 2, wherein searching the e-mail server comprises using WINDOWS™ ACTIVE DIRECTORY™ as a configuration data storage and search tool.

4. The method of claim 2, wherein the e-mail server is the EXCHANGE™ e-mail server.

5. The method of claim 1, wherein the parameter type provides a plurality of methods to identify one or more mailboxes.

6. The method of claim 5, wherein the plurality of methods comprises an identification of all mailboxes, one mailbox, and multiple mailboxes based on a common criteria.

7. The method of claim 5, wherein the identification of one mailbox is selected from one of the group comprising a globally unique identifier, a distinguished name, a domain\account name, a user principal name, a simple mail tool protocol address, and an alias.

8. The method of claim 5, wherein the identification of multiple mailboxes comprises an organizational unit of mailbox users.

9. The method of claim 5, wherein the identification of multiple mailboxes comprises an indication of characters that multiple mailbox names have in common.

10. A computer readable storage medium having computer-executable instructions stored thereon that, if executed by a computing device, cause the computing device to perform operations comprising:
receiving and parsing an input requesting mailbox configuration information from an e-mail server, the input requesting mailbox configuration information from the e-mail server comprising a verb-noun command and having at least one identity parameter identifying at least one mailbox;
identifying the verb-noun command as a cmdlet and initiating a corresponding cmdlet class;
examining the at least one identity parameter for parameter type and binding a property value to the parameter type;
examining the input requesting mailbox configuration information from the e-mail server for a presence of a pipeline verb-noun command,
generating a search filter for retrieving mailbox configuration information based on the parameter type and the property value;
searching the e-mail server and returning retrieved mailbox information matching the search filter;
executing the pipeline verb-noun command, if present, the pipeline verb-noun command specifying an action to be taken with the retrieved mailbox information; and
displaying the retrieved mailbox information.

11. The computer readable storage medium of claim 10, wherein the parameter type provides a plurality of methods to identify one or more mailboxes.

12. The computer readable storage medium of claim 11, wherein the plurality of methods comprises an identification of all mailboxes, one mailbox, and multiple mailboxes based on a common criteria.

13. The computer readable storage medium of claim 11, wherein the identification of one mailbox is selected from one of a group comprising a globally unique identifier, a distinguished name, a domain\account name, a user principal name, a simple mail tool protocol address, and an alias.

14. The computer readable storage medium of claim 11, wherein the identification of multiple mailboxes comprises an organizational unit of mailbox users.

15. The computer readable storage medium of claim 11, wherein the identification of multiple mailboxes comprises an indication of characters that multiple mailbox names have in common.

16. A computer system supporting the administration of an e-mail server, the system comprising:
a memory;
a processor communicatively connected to the memory, the processor configured to:
receive and parse an input requesting mailbox configuration information from the e-mail server, the input requesting mailbox configuration information from the e-mail server comprising a verb-noun command and having at least one identity parameter identifying at least one mailbox;
identify the verb-noun command as a get-mailbox cmdlet and initiating a corresponding cmdlet class;
examine the at least one identity parameter for parameter type and bind a property value to the parameter type;
examine the input requesting mailbox configuration information from the e-mail server for a presence of a pipeline verb-noun command,
generate a search filter for retrieving mailbox configuration information based on the parameter type and the property value;
search the e-mail server and return retrieved mailbox information matching the search filter;
execute the pipeline verb-noun command, if present, the pipeline verb-noun command specifying an action to be taken with the retrieved mailbox information; and
a display device that displays the retrieved mailbox information.

17. The computer system of claim 16, wherein the parameter type provides a plurality of methods to identify one or more mailboxes.

18. The computer system of claim 17, wherein the plurality of methods comprises an identification of all mailboxes, one mailbox, and multiple mailboxes based on a common criteria.

19. The computer system of claim 17, wherein the identification of one mailbox is selected from one of the group comprising a globally unique identifier, a distinguished name, a domain\account name, a user principal name, a simple mail tool protocol address, and an alias.

20. The computer system of claim 17, wherein the identification of multiple mailboxes comprises an organizational unit of mailbox users.

\* \* \* \* \*